United States Patent [19]
Lemanski et al.

[11] Patent Number: 6,067,362
[45] Date of Patent: May 23, 2000

[54] MECHANICAL RESONANCE REDUCING

[75] Inventors: Joseph B. Lemanski, Framingham; James A. West, North Grafton, both of Mass.

[73] Assignee: Bose Corporation, Framingham, Mass.

[21] Appl. No.: 08/842,035

[22] Filed: Apr. 24, 1997

[51] Int. Cl.$^7$ .................................................. H04B 15/00
[52] U.S. Cl. ......................... 381/94.1; 381/56; 348/738
[58] Field of Search .................... 381/56, 57, 93, 381/98, 94.1; 348/738, 744, 836

[56] References Cited

U.S. PATENT DOCUMENTS

| | | | |
|---|---|---|---|
| 4,831,449 | 5/1989 | Kimura | 348/738 |
| 5,400,408 | 3/1995 | Lundgren . | |

FOREIGN PATENT DOCUMENTS 63-241252  9/1988  Japan .

*Primary Examiner*—Ping Lee
*Attorney, Agent, or Firm*—Fish & Richardson P.C.

[57] ABSTRACT

An audio system for use with an electromechanical apparatus having a device coupled to the audio system, the device having a mechanical resonance stimulated by spectral components of vibrations radiated by the audio system, which includes an input for receiving audio signals and a gain reducer. The gain reducer includes a detector detecting in the audio signal the presence of the spectral components that excite the mechanical resonance and also includes a gain cell reducing the gain of said audio signals, either broadband or narrowband, responsive to the detector.

27 Claims, 10 Drawing Sheets

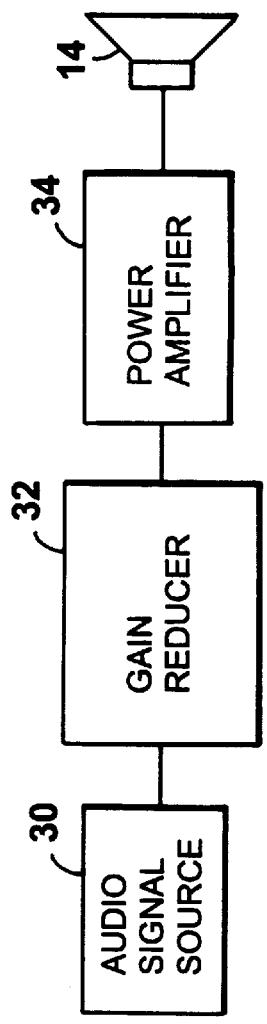
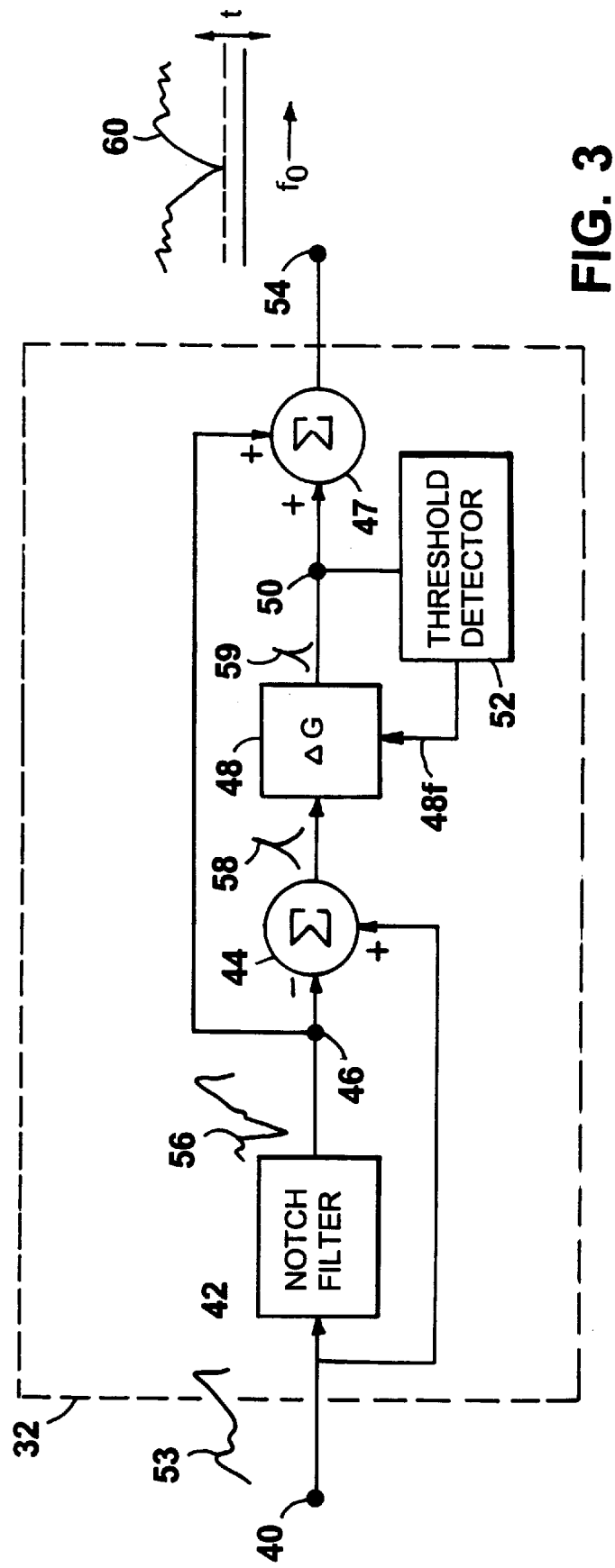

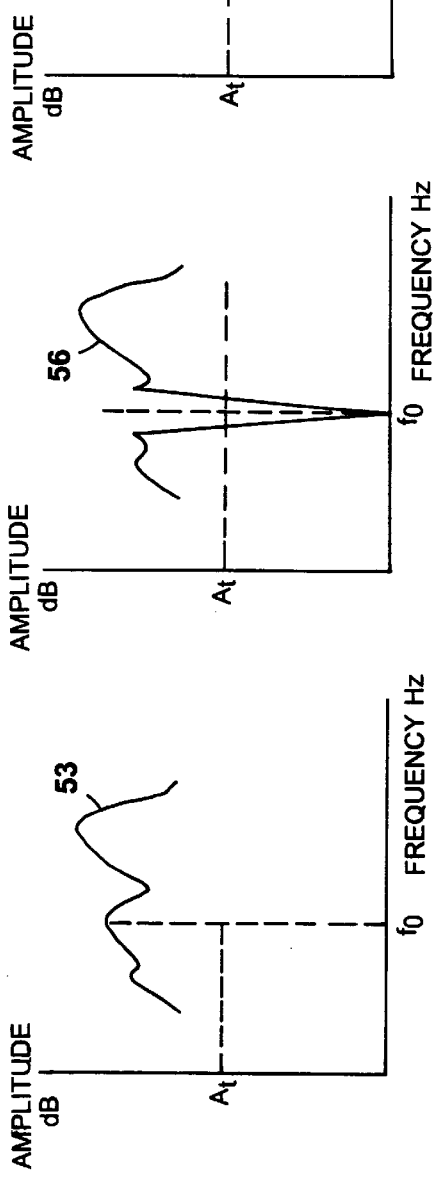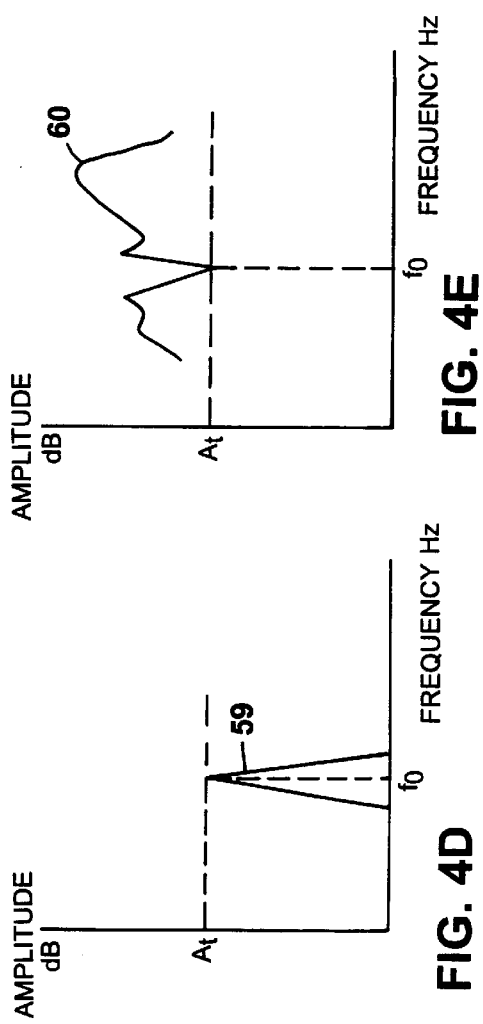

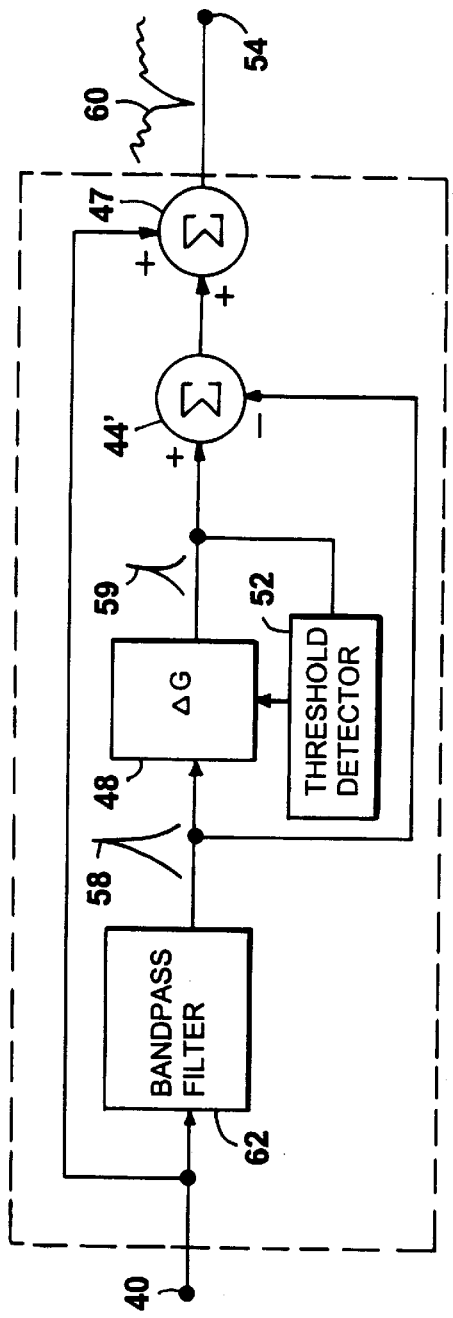
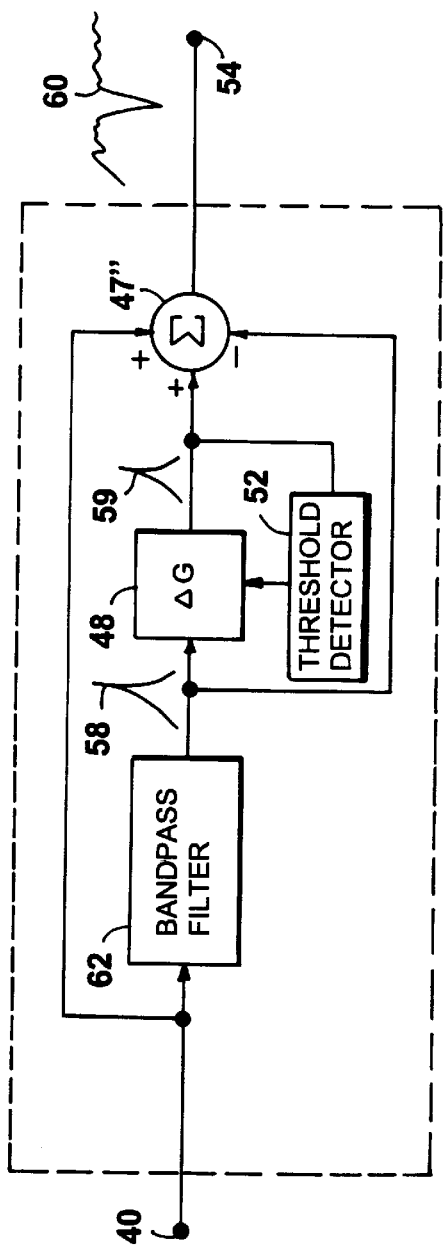
FIG. 7A
FIG. 7B

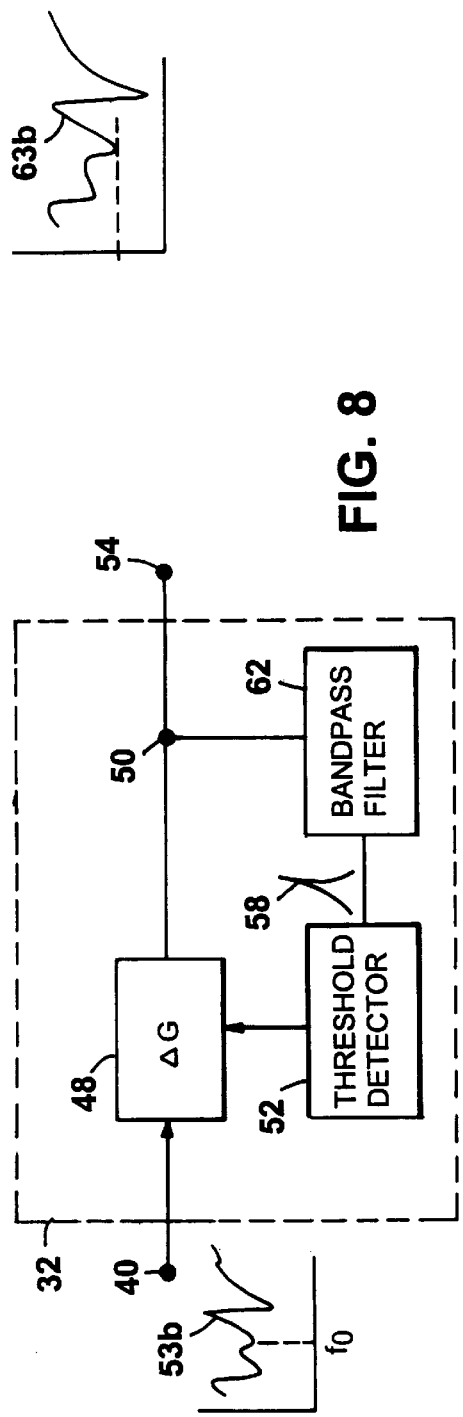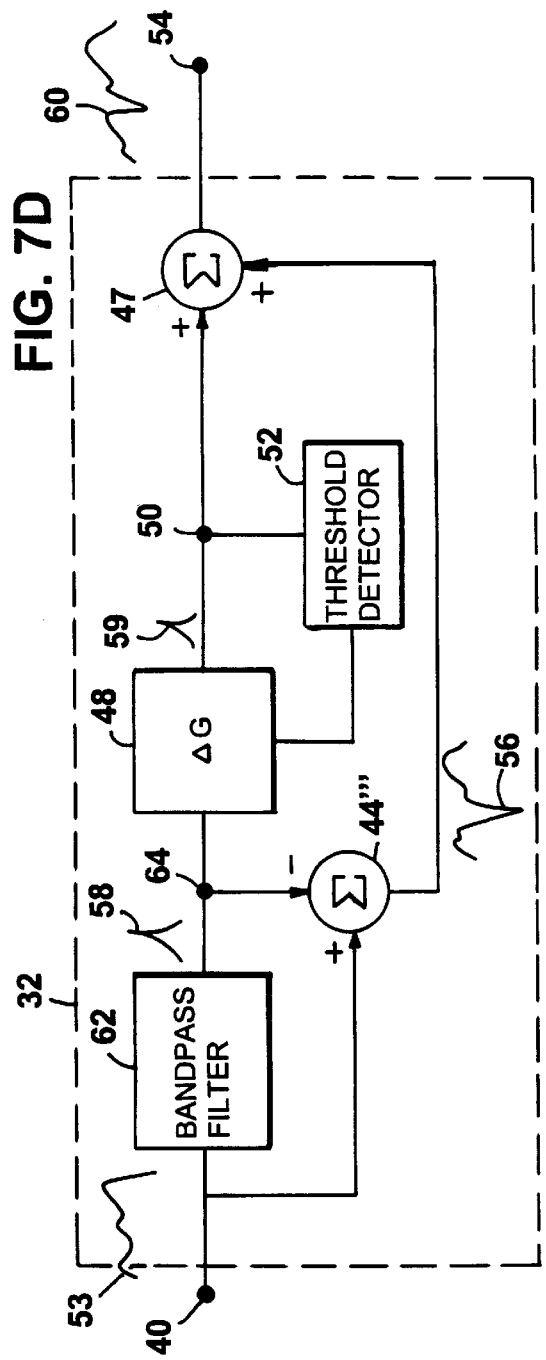

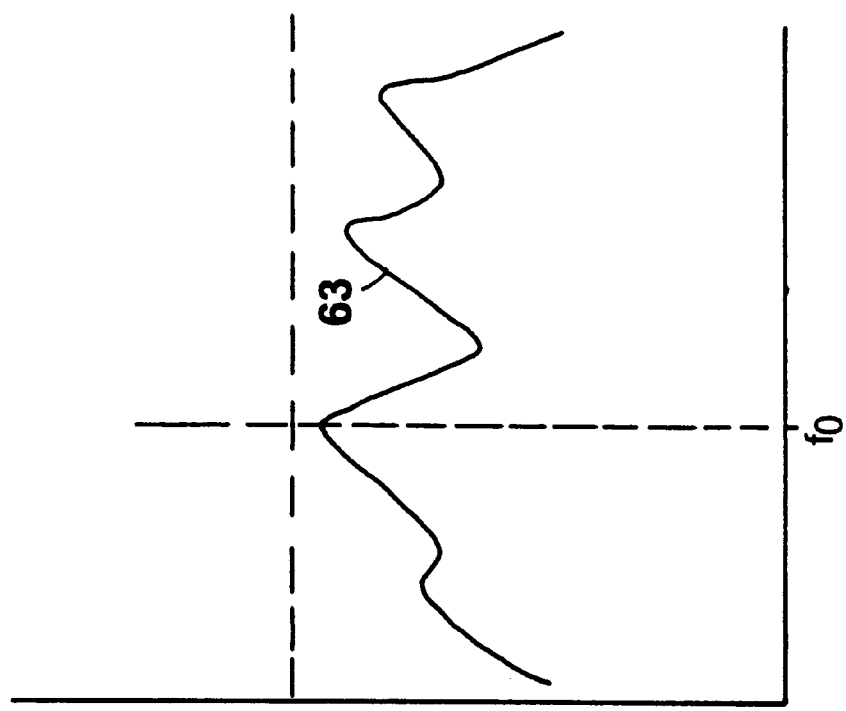
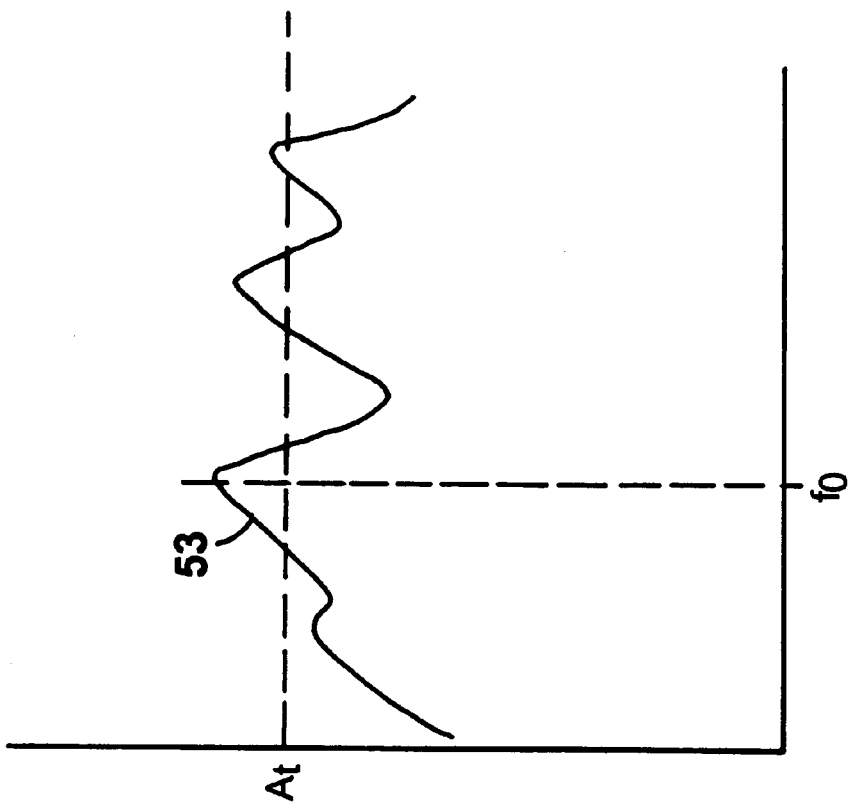
FIG. 9

MECHANICAL RESONANCE REDUCING

The invention relates to mechanical resonances in electromechanical devices stimulated by vibrations from audio systems.

For background, reference is made to U.S. Pat. No. 5,400,408.

It is an important object of the invention to reduce mechanical resonances in electromechanical devices stimulated by vibrations radiated by audio systems.

According to the invention, an audio system for use with an electromechanical apparatus includes a device coupled to the audio system. The device has a mechanical resonance stimulated by spectral components of vibrations from the audio system. The audio system includes an input for receiving audio signals and a gain reducer. The gain reducer includes a detector which detects the presence of the spectral components in the audio signals and a gain cell which reduces the gain of the audio signals responsive to the detector.

In another aspect of the invention, a method of reducing, in an electromechanical device, mechanical vibration caused by vibrations of a predetermined narrow frequency range from an audio system includes detecting, in audio signals being transmitted to the audio system, the presence of spectral components having a frequency in the predetermined narrow frequency range, and reducing the gain, narrowband or broadband, of the audio signals.

In still another aspect of the invention, a mechanical resonance reduction apparatus includes an input for receiving audio signals, an audio system radiating vibrations responsive to the audio signals, an electromechanical device having a mechanical resonance responsive to spectral components of the radiated vibrations, and a gain reducer, for reducing, narrowband or broadband, the gain of the audio signals. Other features, objects, and advantages will become apparent from the following detailed description, which refers to the following drawings in which:

FIG. 2 is a block diagram of a mechanical resonance reducing system according to the invention;

FIG. 3 is a block diagram of a frequency selective gain reducer according to the invention;

FIGS. 4A–4E are a series of plots of amplitude vs. frequency at various points in the frequency selective variable gain reducer of FIG. 3;

FIGS. 7A–7D are alternate embodiments of the frequency selective gain reducer of FIG. 3, employing bandpass filters;

FIG. 8 is a series of plots of amplitude vs. frequency at various points in the gain reducer of FIG. 7;

FIG. 9 is a circuit for implementing the embodiment of FIG. 3;

Figure 1:
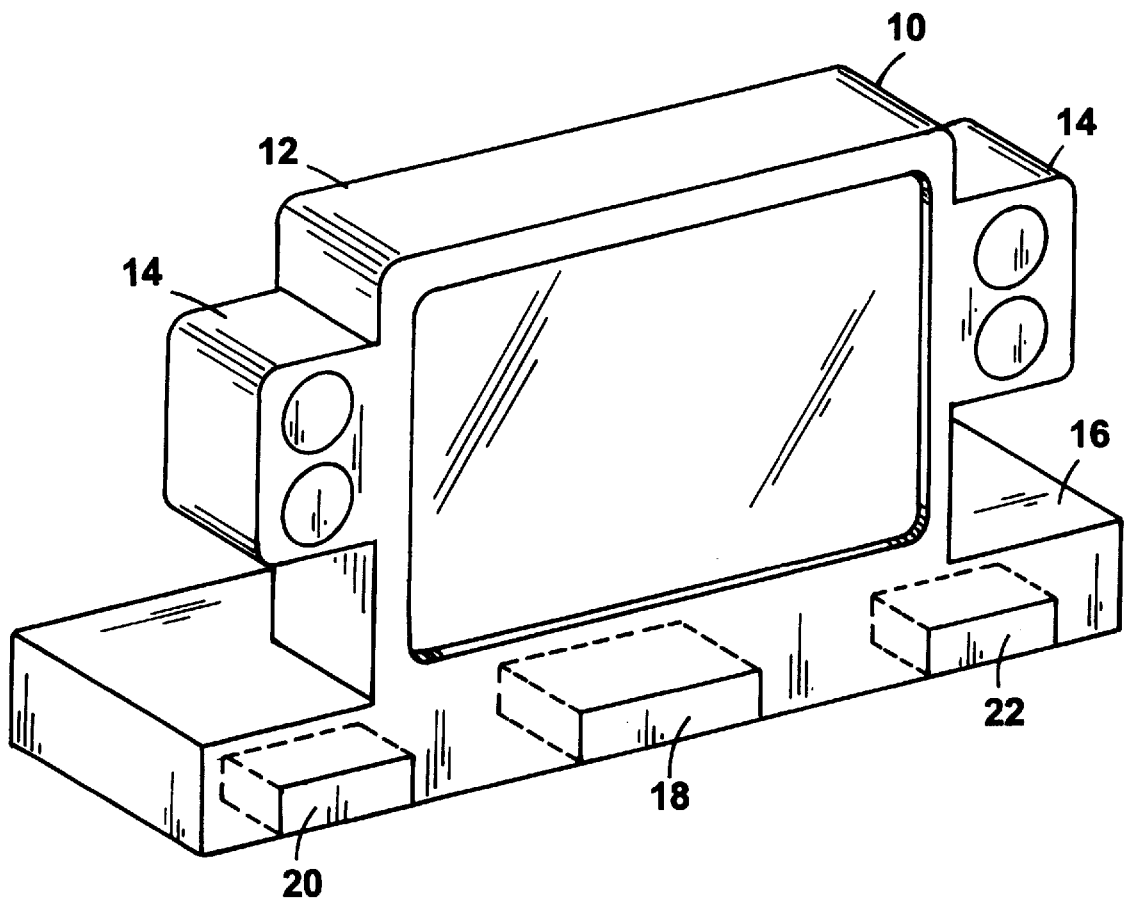
FIG. 1 is a perspective view of an electromechanical system in which the invention could be used.

With reference now to the drawings and more particularly to FIG. 1, there is shown an electromechanical-acoustical system in which the invention might be used. Corresponding elements are usually identified by the same reference symbols throughout the drawings. The system includes loudspeakers 14, and a compact disk (CD) drive 18, a hard disk drive 20, a floppy disk drive 22, and a video monitor 10, which may be may be mechanically coupled, such as by cabinet 12. Loudspeakers 14 are part of an audio system (not shown in this view) that radiates vibrations in response to signals from the CD drive 18 or to some other source of audio signals. Vibrations radiated by the audio system may be either structureborne or airborne or both, and may stimulate mechanical resonance in components, such as the video monitor 10 or the CD drive 18, which receive the vibrations from the audio system. The mechanical resonances may be manifested in interference (as described in U.S. Pat. No. 5,400,408) or "picture shake" in video monitor 12, or as "skipping" in one of the disk drives, such as the CD drive 18. The invention may be advantageously used in many electromechanical-acoustical systems, such as multimedia computers or in home entertainment systems having high definition television sets employing cathode ray tubes with shadow masks or compact disk drives.

Referring now to FIG. 2, there is shown a block diagram of an apparatus which alleviates problems caused by mechanical resonances stimulated by vibrations radiated by audio systems. Audio signal source 30 is coupled to gain reducer 32, power amplifier 34, and loudspeaker 14. In operation, audio signal source 30 transmits electrical signals which represent audio information (hereinafter "audio signals") to gain reducer 32. Gain reducer 32 modifies the audio signals by reducing the gain (broadband or narrowband, as will be described below) of the audio signals, and transmits the modified audio signals to the power amplifier 34. The power amplifier 34 amplifies the modified audio signals and transmits them to the loudspeaker 14, which radiates airborne sonic vibrations responsive to the modified audio signals. In the process of radiating the sonic vibrations, loudspeaker 14 may also induce through air and/or mechanical coupling, mechanical vibrations in one or more components of the system of FIG. 1.

Referring to FIG. 3, there is shown a frequency selective embodiment of the gain reducer 32. Gain reducer input terminal 40 is connected to input of notch filter 42 and to input combiner 44. Notch filter output terminal 46 is connected to input combiner 44 and to output combiner 47. Output of input combiner 44 is connected to variable gain cell 48. Variable gain cell output terminal 50 is coupled to feedback input 48F of variable gain cell 48 through a feedback loop that includes threshold detector 52. Variable gain cell output terminal 50 is also connected to output combiner 47, which is connected to gain reducer output terminal 54.

In operation, the unfiltered input signal 53 is transmitted to the notch filter 42, which outputs a notch signal 56 with a "notch" at frequency $f_0$, the frequency at which a mechanical resonance results in vibration-induced problems. The unfiltered signal is differentially combined with the notch signal 56 by input combiner 44 to yield a "spike" signal 58, with a spike at frequency $f_0$. Spike signal 58 is input to variable gain cell 48. If the amplitude of spike signal 58 exceeds a threshold amplitude, the threshold detector 52 issues a gain control signal to variable gain cell 48, which causes the variable gain cell to attenuate spike signal 58 until it is below the threshold amplitude. The attenuated spike signal 59 is then recombined with filtered signal 56 by output combiner 47 to yield notched or restored output signal 60 at gain reducer output terminal 54.

Referring to FIGS. 4A–4E, there are shown a more detailed view of the audio signal at various points in the frequency selective variable gain reducer of FIG. 3. If the input signal 53 in FIG. 4A contains a spectral component at frequency $f_0$ (that stimulates the mechanical resonance at $f_0$) of an amplitude greater than $A_t$, the threshold amplitude, variable gain reducer 32 modifies the signal so that the notched output signal 60 does not contain a spectral component at frequency $f_0$ of an amplitude greater than $A_t$. Notch signal 56 in FIG. 4B represents the output of notch filter 32; the spectral component at frequency $f_0$ has been essentially filtered from the signal. Spike signal 58 in FIG. 4C represents the output of input combiner 44; spike signal 58 is essentially the portion of input signal 53 that was rejected by notch filter 42. Attenuated spike signal 59 in FIG. 4D represents the output of variable gain cell 48. Attenuated spike signal 59 is essentially spike signal 48 with the amplitude of the spectral component of frequency $f_0$ reduced to the threshold amplitude $A_t$. Notched output signal 60 in FIG. 4F represents the output of gain reducer 32. The "notch" at frequency $f_0$ can be made narrow enough so that there is virtually no audible effect on the sound radiated by loudspeaker 14. If input signal 53 does not contain a spectral component of frequency $f_0$ of an amplitude greater than $A_t$, "notched" output signal 60 is essentially identical to input signal 53.

A system employing the principles of the invention is advantageous over conventional systems, because it does not depend on mechanical damping or on modifications to any of the component devices. Mechanical damping imposes design constraints and may adversely affect the performance of the device. Modification of the component devices may compromise the performance or price of the system. Additionally, a system employing the principles of the invention is advantageous because it operates on the source of the vibrations that stimulate the mechanical resonances and therefore is effective at reducing both structure-borne and airborne vibrations at the problem frequency.

Figure 5:
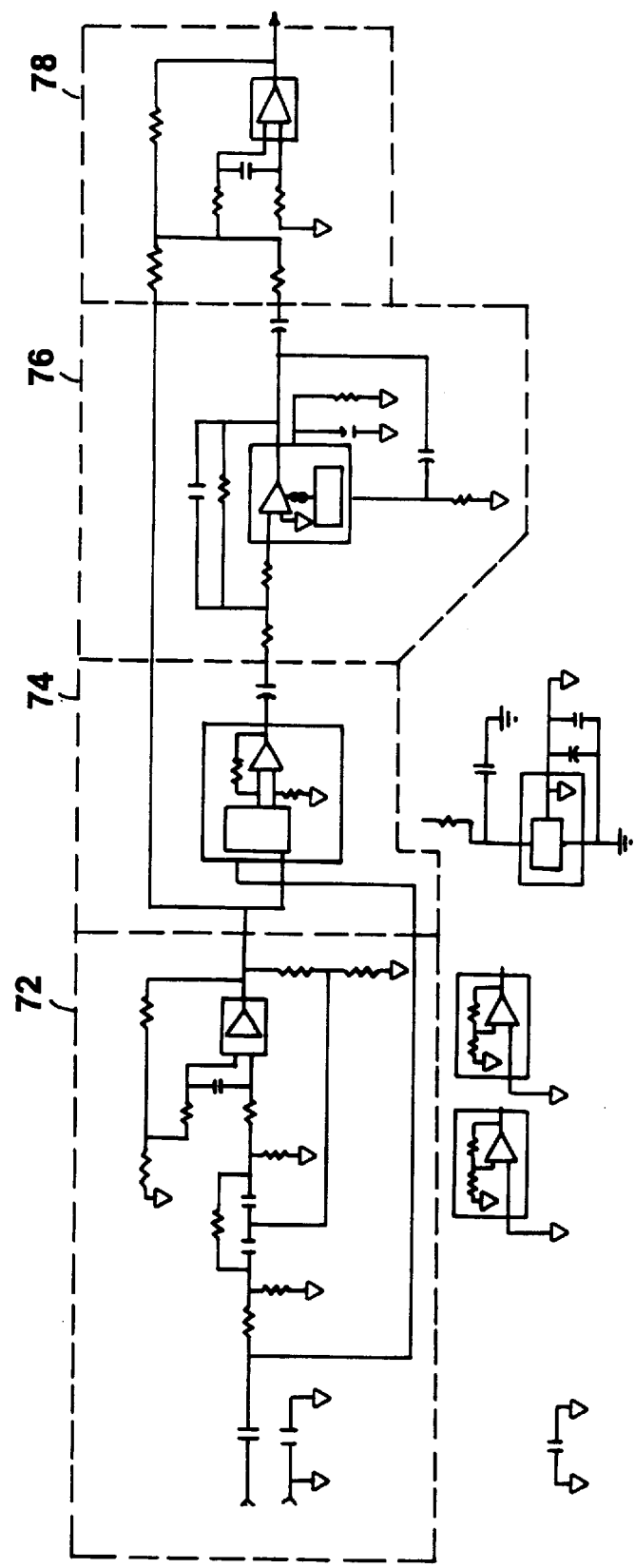
FIG. 5 is a circuit that implements the gain reducer of FIG. 3.

Referring to FIG. 5, there is shown a circuit for implementing the gain reducer of FIG. 3. Generally, first circuit section 72 corresponds to notch filter 42, with a notch frequency $f_0$ at approximately 618 Hz, second circuit section 74 corresponds to input combiner 44, third circuit section 76 corresponds to gain cell 48 and threshold detector 52, and fourth circuit section 78 corresponds to output combiner 47.

Figure 6:
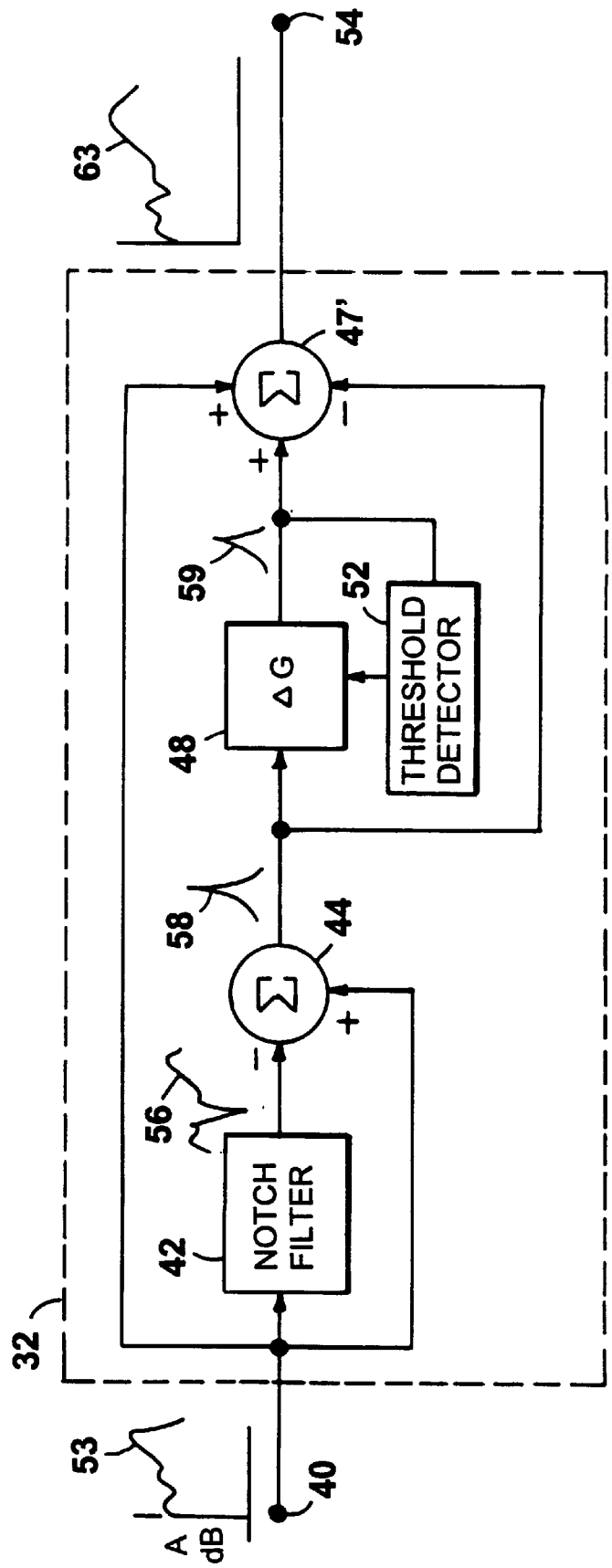
FIG. 6 is an alternate embodiment of the gain reducer of FIG. 3.

Referring to FIG. 6, there is shown an alternate embodiment of the gain reducer 32, which, similar to the embodiment of FIG. 3, employs a notch filter 42, input combiner 44, variable gain cell 48, threshold detector 52 and output combiner 47'. The gain reducer of FIG. 6 differs from that in FIG. 3 by having output combiner 47' cumulatively combining the input signal on terminal 40 and the output signal from gain cell 48 and differentially combining this cumulative combination with the signal at the output of input combiner 44.

Figure 7C:
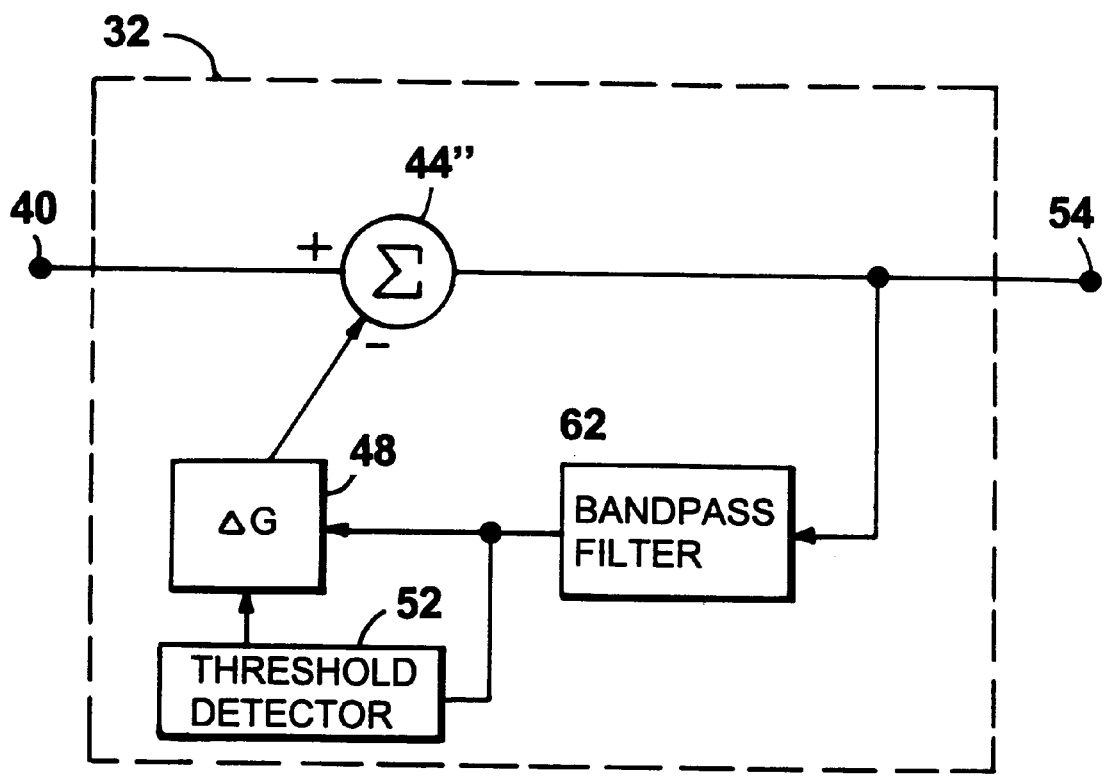

Referring to FIGS. 7A–7D, there are shown alternate embodiments of the gain reducer 32 employing bandpass filters. In FIG. 7A, bandpass filter 62 receives the signal on input terminal 40 and input combiner 44' differentially combines the signals on the output and input of gain cell 48 while output combiner 47 cumulatively combines the output of input combiner 44' with the signal on input terminal 40 to provide the output signal 60. In FIG. 7B, a single combiner 47' cumulatively combines the signal on input terminal 40 with the output 30 signal from gain cell 48 and differentially with the signal at the input of gain cell 48 to provide the output signal 60. In FIG. 7C, input combiner 44" differentially combines the signal on input terminal 40 with the output of gain cell 48 that is energized by the output of bandpass filter 62 having its input coupled to output terminal 54 in a feedback path to provide the output signal on output terminal 54. In FIG. 7D, input combiner 44'" differentially combines the signal on input terminal 40 with the output of bandpass filter 62 to provide an output signal that is cumulatively combined with the output of gain cell 48 by output combiner 47 to provide output signal 60 on terminal 54.

Referring to FIG. 8, there is shown an alternate embodiment of the variable gain reducer 32 of FIG. 3 employing broadband gain reduction. Variable gain reducer input terminal 40 is connected to variable gain cell 48. Variable gain cell output terminal 50 is connected to variable gain cell 48 through a feedback loop that includes bandpass filter 62 (with a passband centered at frequency $f_0$) and the threshold detector 52. Variable gain cell output terminal 50 is also connected to variable gain reducer output terminal 54.

In operation, the input signal is input to bandpass filter 62, which outputs spike signal 58. If spike signal 58 exceeds a threshold amplitude, the threshold detector issues a control signal to the variable gain cell, which attenuates the signal broadband until the spectral component of frequency $f_0$ at the output of the bandpass filter is less than the threshold amplitude, resulting in an attenuated output signal 63' at output terminal 54. The embodiment of FIG. 8 is especially suited to situations in which attenuation of about 6 dB or less is desired.

Referring now to FIG. 9, there is shown a more detailed view of the audio signal at various points in the frequency selective variable gain reducer 32 as shown in FIG. 8, and described in the corresponding part of the description. Curve 53 represents the frequency distribution of the input signal. Curve 63 illustrates that the output of the embodiment of FIG. 8 maintains the same relative frequency distribution, with reduced amplitude at all frequencies.

Figure 10:
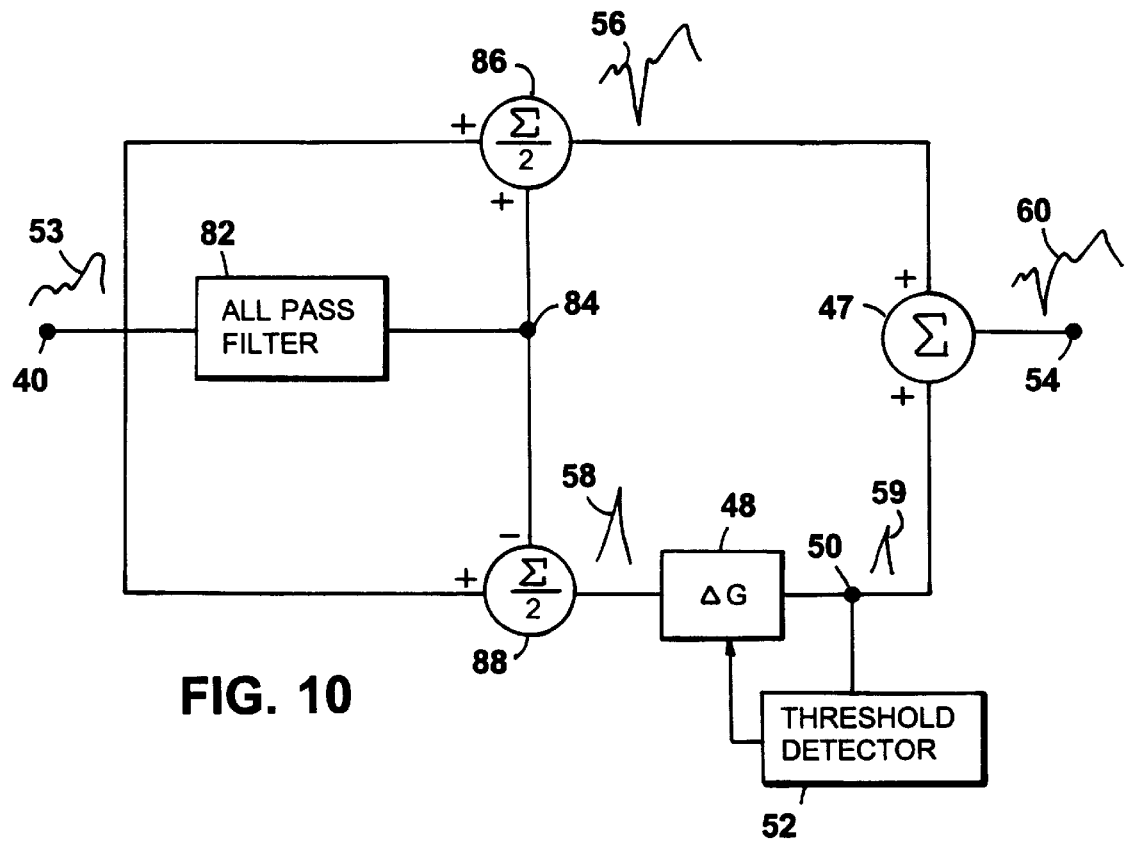
FIG. 10 is an alternate embodiment of the gain reducer of FIG. 3.

Referring now to FIG. 10, there is shown an alternate embodiment of the gain reducer 32 of FIG. 2, employing an all-pass, frequency selective phase shifting filter (hereinafter "all-pass filter"). Gain reducer input terminal 40 is connected to first input combiner 86, which is connected to output combiner 47, and to second input combiner 88. Gain reducer input terminal 40 is also connected to all-pass filter 82 and to second input combiner 88. All-pass, filter output terminal 84 is connected to first input combiner 86 and to second input combiner 88. Second input combiner 88 is connected to variable gain cell 48. Variable gain cell output terminal 50 is coupled to variable gain cell 48 through a feedback loop that includes threshold detector 52. Variable gain cell output terminal 50 is also connected to output combiner 47, which is connected to gain reducer output terminal 54.

Figure 11:
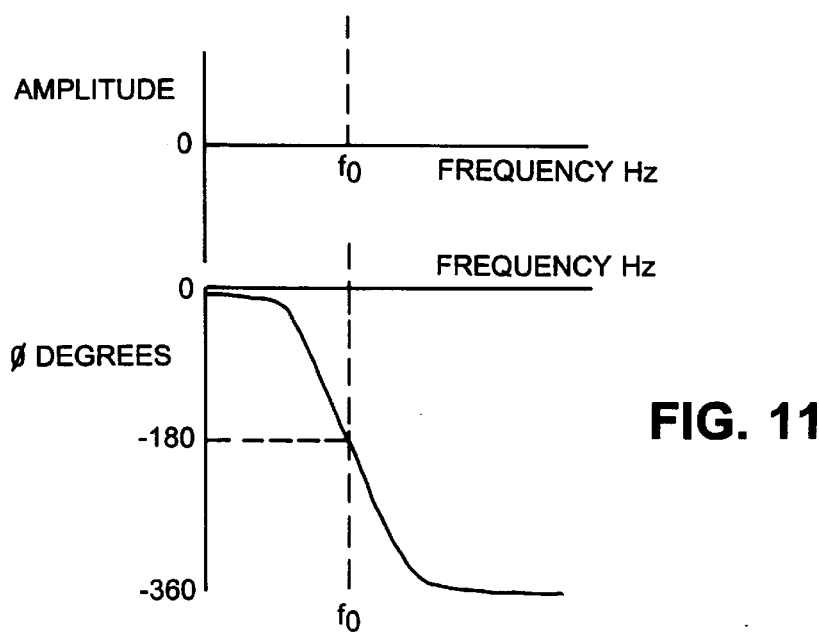
FIG. 11 is a frequency vs. amplitude and frequency vs. phase plot of the all-pass filter of FIG. 10.

Referring to FIG. 11, there is shown the amplitude and phase shift ($\phi$) characteristics of all-pass filter 82 as a function of frequency. Amplitude is unchanged at all frequencies. Phase is shifted such that at frequencies below frequency $f_0$, phase is shifted by 0°, at frequency $f_0$ phase is shifted by −180°, and at frequencies above frequency $f_0$, phase is shifted by −360°.

In operation, output of all-pass filter 82 is out of phase with unfiltered spectral components at frequency $f_0$ and in phase with spectral components at other frequencies. When the output of all-pass filter 82 is combined additively (and halved) with the input signal 53 at input combiner 86 the resultant output is notch signal 56. When the output of all-pass filter 82 is differentially combined (and halved) with the input signal at second input combiner 88, the result is spike signal 58. Variable gain cell 48 and threshold detector 52 operate as in other implementations to yield attenuated spike signal 59. Attenuated spike signal 59 and notch signal 56 are combined additively at output combiner 47, resulting in notched output signal 60 at output terminal 54.

Other embodiments are within the claims

What is claimed is:

1. An audio system for use with an electromechanical apparatus, said electromechanical apparatus including a device coupled to said audio system, said device having a mechanical resonance excited by exciting spectral components of sound radiated by said audio system, comprising:

an input for receiving audio signals, a gain reducer comprising, a threshold detector detecting presence of said exciting spectral components in said audio signals to provide a gain control signal, only when a predetermined threshold amplitude is exceeded, a gain cell reducing gain of said audio signals responsive to said threshold detector coupled to said input and said threshold detector and responsive to said gain control signal constructed and arranged to reduce exciting spectral components of sound radiated by said audio system, wherein said threshold detector is responsive to the amplitude of said exciting spectral components to provide a gain control signal that causes spectral components transmitted by said gain cell to reduce said gain to maintain said amplitude less than said predetermined threshold amplitude.

2. Audio system in accordance with claim 1, wherein said device comprises a disk drive.

3. Audio system in accordance with claim 1, wherein said device comprises a cathode ray tube.

4. Audio system in accordance with claim 3 wherein said device comprises a shadow mask.

5. Audio system in accordance with claim 1, wherein said gain reducer reduces said gain broadband.

6. Audio system in accordance with claim 1, wherein said gain reducer reduces said gain narrowband.

7. Audio system in accordance with claim 6, wherein said gain reducer further comprises a notch filter.

8. Audio system in accordance with claim 1, said gain reducer further comprises a phase shifter.

9. Method for reducing in an electromechanical device mechanical vibration caused by exciting spectral components in a predetermined narrow frequency range in sound radiated by an audio system, comprising:

detecting with a threshold detector in audio signals being transmitted to said audio system, the amplitude of said exciting spectral components, and reducing the gain in said audio system only when a redetermined threshold amplitude is exceeded to maintain said amplitude of said exciting spectral components in said sound of amplitude below said predetermined threshold amplitude.

10. Method in accordance with claim 9, wherein said gain reducing reduces said gain of only said exciting spectral components.

11. Method in accordance with claim 9, wherein said reducing the gain reduces said gain broadband.

12. Method in accordance with claim 9, wherein said reducing comprises shifting the phase of said spectral components.

13. Mechanical resonance reduction apparatus comprising, an electromechanical device having a mechanical resonance at a frequency $f_0$ in the audio frequency range, an audio system coupled to said electromechanical device constructed and arranged to radiate sound in the audio frequency range having spectral components embracing said frequency $f_0$ said audio system including, a threshold detector for detecting the amplitude of spectral components having frequency $f_0$ for providing a gain control signal only when a predetermined threshold amplitude is exceeded, a gain reducer responsive to said gain control signal for providing a gain control signal coupled to said threshold detector constructed and arranged to limit the amplitude of the spectral components of the radiated sound at frequency $f_0$ below said predetermined threshold level.

14. Mechanical resonance reduction apparatus in accordance with claim 13 wherein said device comprises a disk drive.

15. Mechanical resonance reduction apparatus in accordance with claim 14 wherein said device comprises a compact disk player.

16. Mechanical resonance reduction apparatus in accordance with claim 15 wherein said apparatus comprises a cathode ray tube.

17. A method for reducing mechanical resonance at a known frequency induced by sound radiated by an audio system comprising, detecting with a threshold detector the magnitude of resonance inducing features associated with the sound being radiated, to provide a gain control signal only when a predetermined threshold amplitude is exceeded and controlling the radiated sound with said gain control signal to reduce the magnitude of the resonance inducing features to amplitude below said predetermined threshold amplitude.

18. Method for reducing in an electromechanical device mechanical vibration caused by exciting spectral components in a predetermined narrow frequency range in sound radiated by an audio system, comprising, detecting with a threshold detector said exciting spectral components in audio signals being transmitted to said audio system to provide a gain control signal only when a predetermined threshold amplitude is exceeded, reducing the gain of only said exciting spectral components in said audio system in response to said gain control signal to maintain said exciting spectral components in said sound of amplitude below said predetermined threshold amplitude, differentially combining said exciting spectral components with said audio signals to provide a difference signal, reducing gain of said exciting spectral components to provide reduced gain spectral components, and adding the reduced gain spectral components to said difference signal.

19. Mechanical resonance reduction apparatus comprising, an electromechanical device having a mechanical resonance at a frequency $f_0$ in the audio frequency range, an audio system coupled to said electromechanical device constructed and arranged to radiate sound in the audio frequency range having spectral components embracing said frequency $f_0$ said audio system including a gain reducer constructed and arranged to limit the amplitude of the spectral components of the radiated sound of frequency $f_0$ below a predetermined threshold level, and a threshold detector responsive to spectral components of audio signals processed by said audio system of frequency $f_0$ for providing a gain control signal to said gain reducer to maintain the amplitude of spectral components at said frequency $f_0$ in sound radiated by said audio system less than a predetermined threshold level.

20. Mechanical resonance reduction apparatus in accordance with claim 19 wherein said gain reducer includes, an input terminal for receiving an input audio signal, a notch filter having its input coupled to said input terminal and constructed and arranged to significantly attenuate spectral components at said frequency $f_0$, an input combiner constructed and arranged to differentially combine the output of said notch filter with the signal on said input terminal to provide a difference signal, a variable gain cell having its input coupled to the output of said input combiner and a control input for receiving a gain control signal, said threshold detector having its input coupled to the output of said variable gain cell and its output coupled to said gain control input, and an output signal combiner constructed and arranged to cumulatively combine the output signal on the output of said variable gain cell with the signal on the output of said notch filter to provide a restored output signal.

21. A mechanical resonance reduction apparatus in accordance with claim 19 wherein said reducer comprises, an input terminal for receiving an input audio signal, a notch filter having its input coupled to said input terminal and constructed and arranged to significantly attenuate spectral components at said frequency $f_0$, an input combiner constructed and arranged to differentially combine the output of said notch filter with the signal on said input terminal to provide a difference signal, a variable gain cell having its input coupled to the output of said input combiner and a control input for receiving a gain control signal, said threshold detector having its input coupled to the output of said variable gain cell and its output coupled to said gain control input, and an output combiner constructed an arranged to cumulatively combine the signal on said input terminal and the signal on the output of said variable gain cell and differentially combine the signal at the output of said input combiner to provide a restored output signal.

22. A mechanical resonance reduction apparatus in accordance with claim 19 wherein said gain reducer comprises, an input terminal for receiving an input audio signal, a bandpass filter having its input coupled to said input terminal and constructed and arranged to selectively transmit spectral components substantially at said frequency $f_0$, a variable gain cell having its input coupled to the output of said bandpass filter and a gain control input, said threshold detector having its input coupled to the output of said variable gain cell and its output coupled to said gain control input, an input combiner constructed and arranged to differentially combine the signal on the output of said variable gain cell with the signal on the output of said bandpass filter, and an output combiner constructed and arranged to cumulatively combine the signal on said input terminal with the signal on the output of said input combiner to provide at its output a restored output signal.

23. Mechanical resonance reduction apparatus in accordance with claim 19, wherein said gain reducer comprises, an input terminal for receiving an audio signal, a bandpass filter having its input coupled to said input terminal and constructed and arranged to selectively transmit spectral components substantially at said frequency $f_0$, a variable gain cell having its input coupled to the output of said bandpass filter and a gain control input, said threshold detector having its input coupled to the output of said variable gain cell and its output coupled to said gain control input constructed and arranged to provide a gain control signal to said gain control input that maintains the amplitude of spectral components at the output of said variable gain cell of frequency $f_0$ below a predetermined threshold level, and an output signal combiner constructed and arranged to cumulatively combine the signal on said input terminal with the signal at the output of said variable gain cell and differentially combine the signal at the output of said bandpass filter to provide at its output a restored output signal.

24. A mechanical resonance reduction apparatus in accordance with claim 19 wherein said gain reducer comprises, an input terminal, a bandpass filter having an input and constructed and arranged to selectively transmit spectral components substantially at said frequency $f_0$, a variable gain cell having an input coupled to the output of said bandpass filter and a gain control input coupled to the output of said bandpass filter constructed and arranged to maintain at its output spectral components at said frequency $f_0$ below a predetermined threshold level, a combiner constructed and arranged to differentially combine the signal on said input terminal with the signal on the output of said variable gain cell to provide on its output a restored output signal, the output of said combiner being coupled to the input of said bandpass filter.

25. A mechanical resonance reducing apparatus in accordance with claim 19 wherein said gain reducer comprises, an input terminal for receiving an input audio signal, a bandpass filter having its input coupled to said input terminal constructed and arranged to selectively transmit spectral components substantially at said frequency $f_0$, an input combiner constructed and arranged to differentially combine the signal on said input terminal with the signal on the output of said bandpass filter to provide at its output a difference signal, a variable gain cell having its input coupled to the output of said bandpass filter and having a gain control input, said threshold detector having an input coupled to the output of said variable gain cell and its output coupled to said gain control input constructed and arranged to control the gain of said variable gain cell to maintain spectral components at the output of said variable gain cell at said frequency $f_0$ less than a predetermined threshold level, and an output combiner for cumulatively combining the output of said variable gain cell with the output of said input combiner to provide at its output an output restored signal.

26. A mechanical resonance reduction apparatus in accordance with claim 19, wherein said gain reducer comprises, an input terminal, a variable gain cell having its input coupled to said input terminal and having a gain control input, a bandpass filter having its input coupled to the output of said variable gain cell constructed and arranged to selectively transmit spectral components substantially at said frequency $f_0$, a said threshold detector having its input coupled to the output of said bandpass filter and its output coupled to said gain control input constructed and arranged to provide a gain control signal that maintains the output of said variable gain cell of the amplitude of spectral components at said frequency $f_0$ less than a predetermined threshold.

27. A mechanical resonance reduction apparatus in accordance with claim 19, wherein said gain reducer comprises, an input terminal for receiving an audio signal, an all-pass filter having its input coupled to said input terminal constructed and arranged to transmit spectral components in the audio frequency range substantially uniformly in amplitude while affecting a phase shift of substantially 0° below said frequency $f_0$, 360° at frequencies above said frequency $f_0$ and −180° substantially at said frequency $f_0$, a first input combiner constructed and arranged to cumulatively combine half the signal on the output of said all-pass filter with the signal on said input terminal, a second input combiner constructed and arranged to differentially combine half the signal on the output of said all-pass filter with the signal on said input terminal, a variable gain cell having its input coupled to the output of said second input combiner and a gain control input, said threshold detector having its input coupled to the output of said variable gain cell and its output coupled to the gain control input of said variable gain cell constructed and arranged to provide a gain control signal that maintains the amplitude of spectral components on the output of said variable gain cell at said frequency $f_0$ less than a predetermined threshold, and an output combiner for cumulatively combining the output of said first input combiner with the output of said variable gain cell to provide on its output a restored output signal.

* * * * *